(12) United States Patent
Chen et al.

(10) Patent No.: US 12,190,424 B1
(45) Date of Patent: Jan. 7, 2025

(54) SPEECH DRIVEN TALKING FACE (71) Applicant: Zoom Video Communications, Inc., San Jose, CA (US)

(72) Inventors: Yuhui Chen, San Jose, CA (US); Cheng Lun Hu, Singapore (SG); Bo Ling, Saratoga, CA (US); Gengdai Liu, Singapore (SG); Huixi Zhao, San Jose, CA (US); Yian Zhu, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/322,881

(22) Filed: May 24, 2023

Related U.S. Application Data (63) Continuation of application No. 17/701,603, filed on Mar. 22, 2022, now abandoned.

(51) Int. Cl.
*G06T 13/20* (2011.01)
*G06T 13/40* (2011.01)
*G06V 20/40* (2022.01)
*G10L 25/18* (2013.01)
*G10L 25/57* (2013.01)
*H04L 65/403* (2022.01)

(52) U.S. Cl.
CPC ............ *G06T 13/205* (2013.01); *G06T 13/40* (2013.01); *G06V 20/40* (2022.01); *G10L 25/18* (2013.01); *G10L 25/57* (2013.01); *H04L 65/403* (2013.01)

(58) Field of Classification Search
CPC ....... G06T 13/40; G06T 13/205; G10L 25/18; G10L 25/57; G06V 20/40; H04L 65/403
See application file for complete search history.

(56) References Cited

U.S. PATENT DOCUMENTS

| | | | |
|---|---|---|---|
| 6,539,354 | B1 | 3/2003 | Sutton et al. |
| 11,113,859 | B1* | 9/2021 | Xiao ............... G06T 15/005 |
| 2005/0185045 | A1 | 8/2005 | Kamariotis |
| 2008/0259085 | A1 | 10/2008 | Chen et al. |
| 2015/0127352 | A1 | 5/2015 | Norsworthy |
| 2017/0076749 | A1 | 3/2017 | Kanevsky et al. |
| 2017/0178306 | A1 | 6/2017 | Le Clerc et al. |
| 2019/0138096 | A1* | 5/2019 | Lee .................. G10L 25/51 |
| 2019/0392823 | A1 | 12/2019 | Li et al. |
| 2020/0294495 | A1* | 9/2020 | Li ..................... G06N 3/044 |

(Continued)

OTHER PUBLICATIONS

Zhou, Y., Xu, Z., Landreth, C., Kalogerakis, E., Maji, S., & Singh, K. (2018). Visemenet: Audio-driven animator-centric speech animation. ACM Transactions on Graphics (TOG), 34(4), 1-10. (Year: 2018).

*Primary Examiner* — Phi Hoang
(74) *Attorney, Agent, or Firm* — Young Basile Hanlon & MacFarlane, P.C.

(57) ABSTRACT

Various embodiments of an apparatus, method(s), system(s) and computer program product(s) described herein are directed to a Viseme Engine. The Viseme Engine receives audio data associated with a user account. The Viseme Engine predicts at least one viseme that corresponds with a portion of phoneme audio data and identifies one or more facial expression parameters associated with the predicted viseme. The facial expression parameters being applicable to a face model. The Viseme Engine renders the predicted viseme according to the one or more facial expression parameters.

20 Claims, 9 Drawing Sheets

(56) References Cited

U.S. PATENT DOCUMENTS

| | | | |
|---|---|---|---|
| 2021/0248801 A1* | 8/2021 | Li | G06T 13/205 |
| 2022/0108510 A1* | 4/2022 | Sagar | G10L 21/12 |
| 2022/0406315 A1* | 12/2022 | Etayo | G06F 3/017 |
| 2023/0111633 A1* | 4/2023 | Paruchuri | G06T 13/40 |
| | | | 705/26.7 |

* cited by examiner

SPEECH DRIVEN TALKING FACE

CROSS-REFERENCE TO RELATED APPLICATION(S)

This application is a continuation of U.S. patent application Ser. No. 17/701,603, filed Mar. 22, 2022, the entire disclosure of which is hereby incorporated by reference.

FIELD

Various embodiments relate generally to digital communication, and more particularly, to online video and audio.

SUMMARY

The appended Abstract may serve as a summary of this application.

BRIEF DESCRIPTION OF THE DRAWINGS

The present disclosure will become better understood from the detailed description and the drawings, wherein.

DETAILED DESCRIPTION

Various embodiments of an apparatus, method(s), system (s) and computer program product(s) described herein are directed to a Viseme Engine. This feature may require authorization of an account administrator prior to use. The Viseme Engine receives audio data associated with a user account. The Viseme Engine predicts at least one viseme that corresponds with a portion of audio data and identifies one or more facial expression parameters associated with the predicted viseme. For example, a predicted viseme corresponds to a portion of audio date that represents sound for a portion of a phoneme. The facial expression parameters being applicable to a face model. The Viseme Engine renders the predicted viseme according to the one or more facial expression parameters.

Various embodiments of a Viseme Engine are described herein that provide functionality for generation of animated facial movements for a digital embodiment associated with a user account based on audio data associated with the user account. The user account may correspond to a participant in a virtual online conference. However, the user account may opt out of providing video data. That is, the user account may not be providing video data for a video feed showing the live, physical appearance of an individual accessing the virtual online conference via the user account.

The user account may elect for a digital embodiment to be presented in the virtual online conference in place of video presenting the individual's live, physical appearance. However, actual audio data for the user account will is still generated based on the individual speaking. The audio data is captured and transmitted in the virtual online conference.

A phoneme is a perceptually distinct unit of sound and a viseme is a mouth shape that is presented by a human face when a particular phoneme is being spoken. It is the case that multiple phonemes may correspond to the same viseme. Stated differently, multiple sounds, when physically performed by an individual, may present the individual forming a similar mouth shape.

Various embodiments described herein process and analyze the audio data of a speaker user account in real-time to predict one or more viseme animations to be rendered for display via a digital embodiment that represents the speaker user account. The Viseme Engine captures and processes audio data of a speaker user account and identifies a portion (s) of the audio data that occurs prior to completion of a phoneme in the audio data to predict an identification of a viseme that corresponds with the phoneme while sound of the phoneme is still incomplete.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the invention. The invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1A:
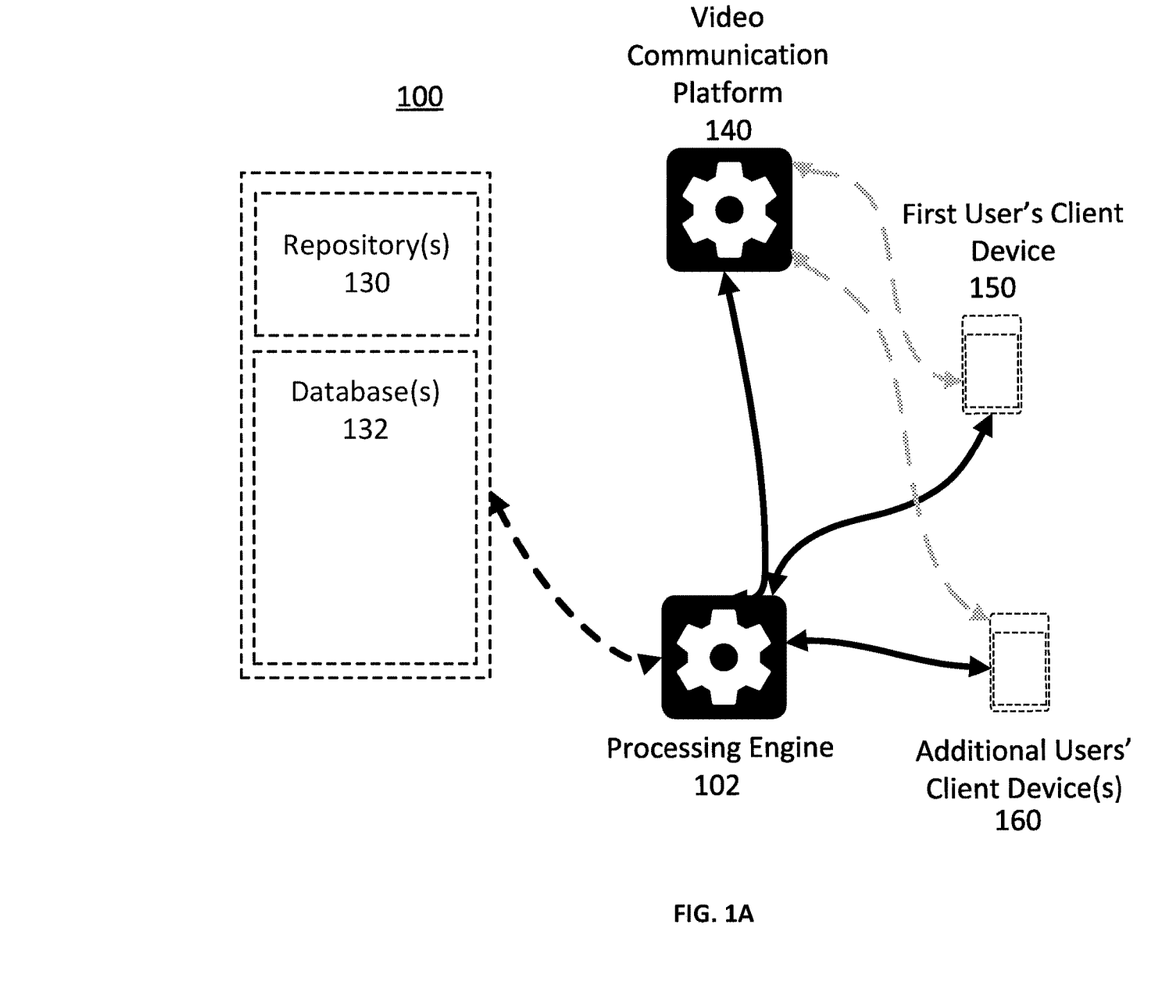
FIG. 1A is a diagram illustrating an exemplary environment in which some embodiments may operate.

FIG. 1A is a diagram illustrating an exemplary environment in which some embodiments may operate. In the exemplary environment 100, a sending client device 150, one or more receiving client device(s) 160 are connected to a processing engine 102 and, optionally, a communication platform 140. The processing engine 102 is connected to the communication platform 140, and optionally connected to one or more repositories 130 and/or databases 132 of historical virtual online event data, such as historical virtual meeting data One or more of the databases may be combined or split into multiple databases. The sending client device 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, the sending client device, receiving client device, processing engine, and/or communication platform may be part of the same computer or device.

In an embodiment(s), the processing engine 102 may perform methods 500,600 (of FIGS. 5, 6) or other method herein. In some embodiments, this may be accomplished via communication with the sending client device, receiving client device(s), processing engine 102, communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

Sending client device 150 and receiving client device(s) 160 are devices with a display configured to present information to a user of the device. In some embodiments, the sending client device 150 and receiving client device(s) 160 present information in the form of a user interface (UI) with UI elements or components. In some embodiments, the sending client device 150 and receiving client device(s) 160 send and receive signals and/or information to the processing engine 102 and/or communication platform 140. The sending client device 150 is configured to submit messages (i.e., chat messages, content, files, documents, media, or other forms of information or data) to one or more receiving client device(s) 160. The receiving client device(s) 160 are configured to provide access to such messages to permitted users within an expiration time window. In some embodiments, sending client device 150 and receiving client device (s) are computer devices capable of hosting and executing one or more applications or other programs capable of sending and/or receiving information. In some embodiments, the sending client device 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device 150 and/or receiving client device(s) 160. In some embodiments, one or more of the communication platform 140, processing engine 102, and sending client device 150 or receiving client device 160 may be the same device. In some embodiments, the sending client device 150 is associated with a sending user account, and the receiving client device(s) 160 are associated with receiving user account(s).

In some embodiments, optional repositories function to store and/or maintain, respectively, user account information associated with the communication platform 140, conversations between two or more user accounts of the communication platform 140, and sensitive messages (which may include sensitive documents, media, or files) which are contained via the processing engine 102. The optional repositories may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate communication between two or more parties, such as within a conversation, "chat" (i.e., a chat room or series of public or private chat messages), video conference or meeting, message board or forum, virtual meeting, or other form of digital communication. In some embodiments, the platform 140 may further be associated with a video communication environment and a video communication environment client application executed on one or more computer systems.

Figure 1B:
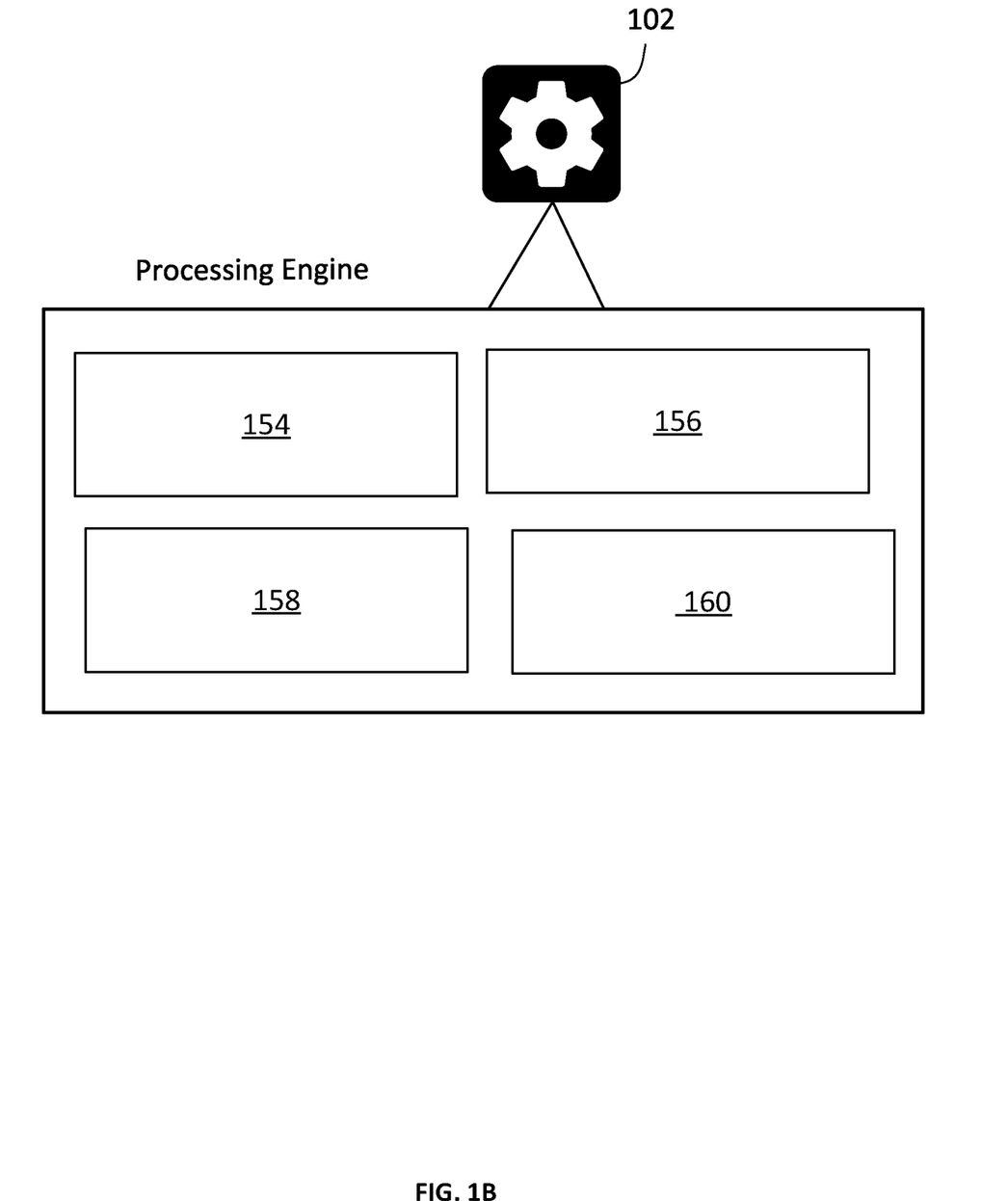
FIG. 1B is a diagram illustrating an exemplary environment in which some embodiments may operate.

FIG. 1B is a diagram illustrating exemplary software modules 154, 156, 158, 160 of a Viseme Engine that may execute at least some of the functionality described herein. According to some embodiments, one or more of exemplary software modules 154, 156, 158, 160 may be part of the processing engine 102. In some embodiments, one or more of the exemplary software modules 154, 156, 158, 160 may be distributed throughout the communication platform 140.

The audio reception module 154 functions to receive audio data associated with a user account.

The prediction module 156 function to predict at least one viseme that corresponds with a portion of phoneme audio data.

The parameter module 158 identifies one or more facial expression parameters associated with the predicted viseme.

The rendering module 160 renders the predicted viseme according to the one or more facial expression parameters.

The above modules 154, 156, 158, 160 and their functions will be described in further detail in relation to the examples of FIGS. 3A, 3B, 4, 5 and 6.

Figure 2:
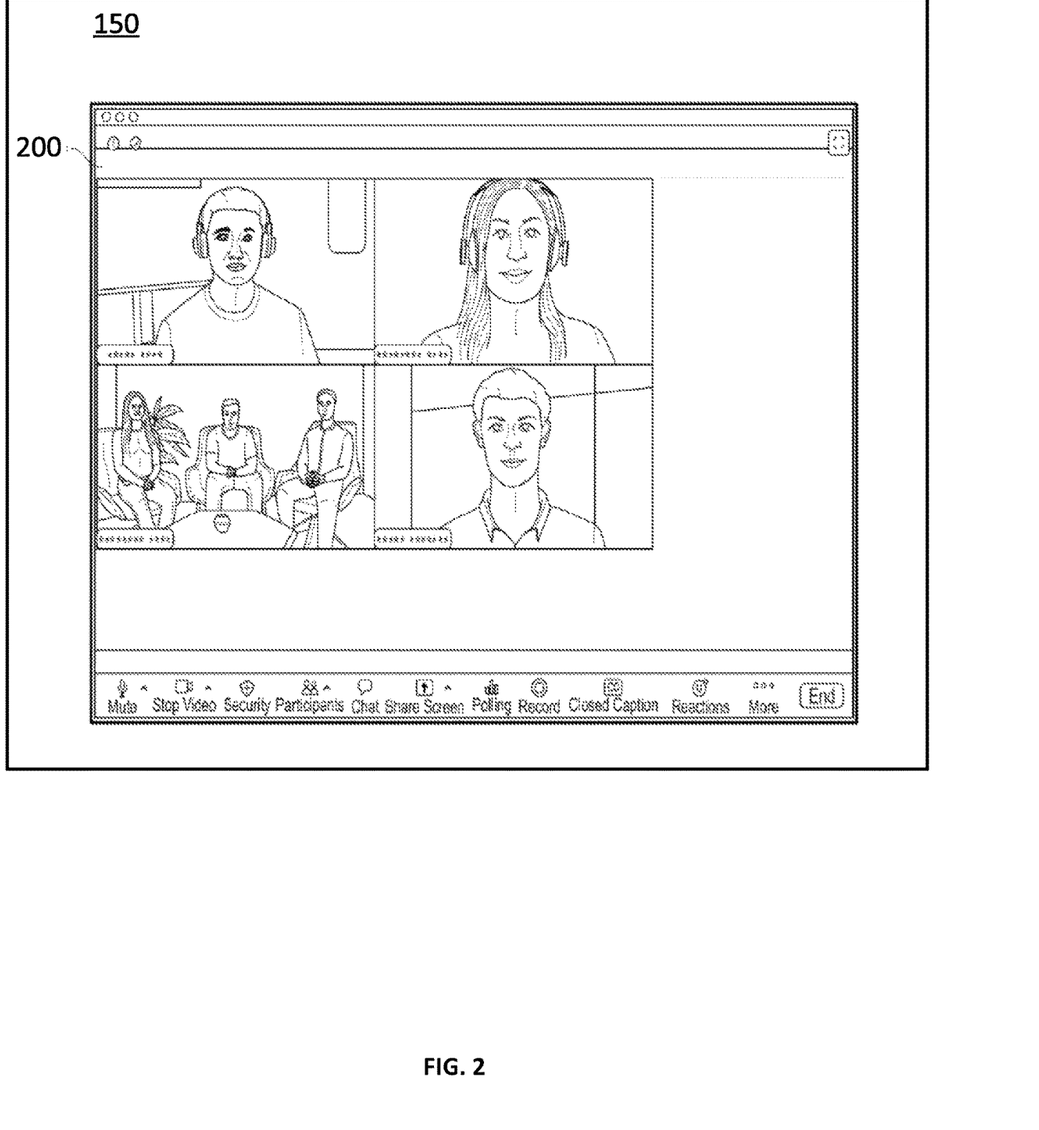
FIG. 2 is a diagram illustrating an exemplary environment in which some embodiments may operate.

As shown in the example of FIG. 2, a user account communications interface 200 for accessing and communicating with the platform 140 and displayed at a computer device 150. The interface 200 provides access to video data, audio data, chat data and meeting transcription related to an online event(s), such as a virtual webinar or a virtual meeting joined by a user account associated with the computer device 150. The interface 200 further provides various types of tools, functionalities, and settings that can be selected by a user account during an online event. Various types of virtual meeting control tools, functionalities, and settings are, for example, mute/unmute audio, turn on/off video, start meeting, join meeting, view and call contacts.

Figure 3A:
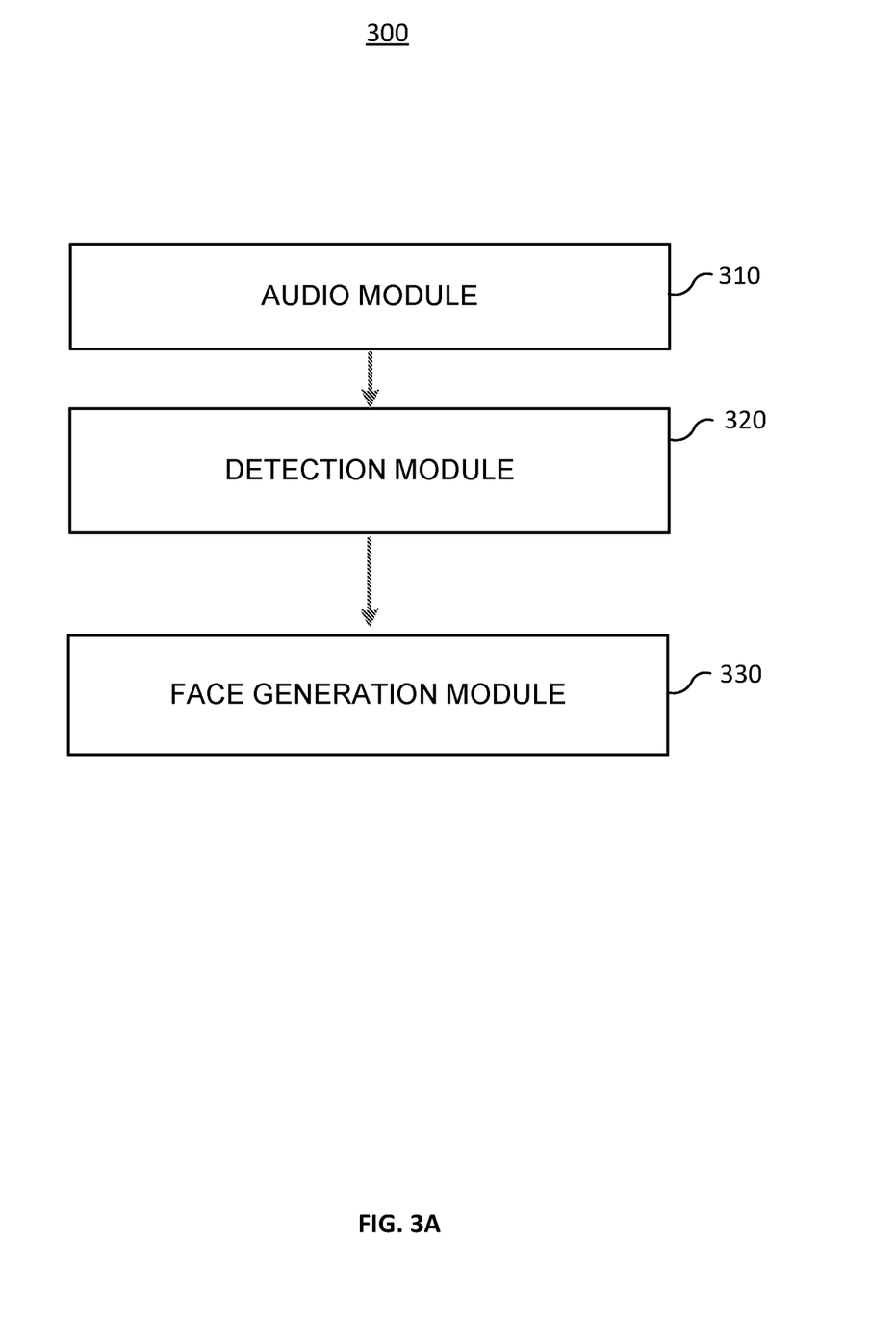
FIG. 3A is a diagram illustrating an exemplary environment in which some embodiments may operate.

As shown in the example diagram 300 of FIG. 3A, the Viseme Engine includes an audio processing module 310, a viseme and emotion detection module 320 and a talking face generation module 330. In various embodiments, a user account participating in a virtual online conference may be a speaker user account whereby audio data is captured. The captured audio data represents the spoken words of an individual accessing the virtual online conference via the speaker user account. The audio processing module 310 processes the audio data via implementing acoustic echo cancellation, noise suppression and/or automatic gain control. The audio processing module 310 further segments the audio data according to a frame measurement. For example, the audio data is captured at 200 millisecond frames- or any amount between 100 to 500 milliseconds. However, various embodiments may use a frame duration of any amount of time.

The viseme and emotion detection module 320 receives audio data from the audio processing module as input data 310. The viseme and emotion detection module 320 predicts an appropriate viseme for a current portion of audio data based on various features of portions of audio data that precedes the current portion of audio data. For example, the module 320 receives the audio data as audio frames defined according to a period of time, such as 100, 200, 300, 400 or 500 millisecond audio frames. The current portion of audio data represents, for example, 10 milliseconds of sound that is currently being heard (or currently being transmitted from a speaker user account) in an online virtual conference. In various embodiment, the current portion of audio data may further be a portion of a phoneme sound prior to completion of that phoneme sound. Therefore, the module 320 generates a real-time prediction of the viseme that corresponds to a phoneme sound occurring in real-time in a virtual online conference prior to completion of the phoneme sound.

The talking face generation module 330 receives a sequence of predicted visemes from the viseme and emotion detection module 320. The module 330 determines one or more sets of facial expression parameters based on the predicted visemes. The facial expression parameters correspond to a predefined three-dimensional (3D) face model. In various embodiments, a user account participating in a virtual online conference may elect to be represented by a digital embodiment, which is a rendered instance of the 3D face model, in place of sending a live camera video feed.

A set of facial expression parameters represents parameters for rendering a performance of a particular viseme by the digital embodiment. In some embodiments, the module 330 may further generate additional sets of facial expression parameters, whereby the additional sets of facial expression parameters correspond to performance(s) of rendered transitionary facial expressions by the digital embodiment between performances of rendered, predicted visemes.

Figure 3B:
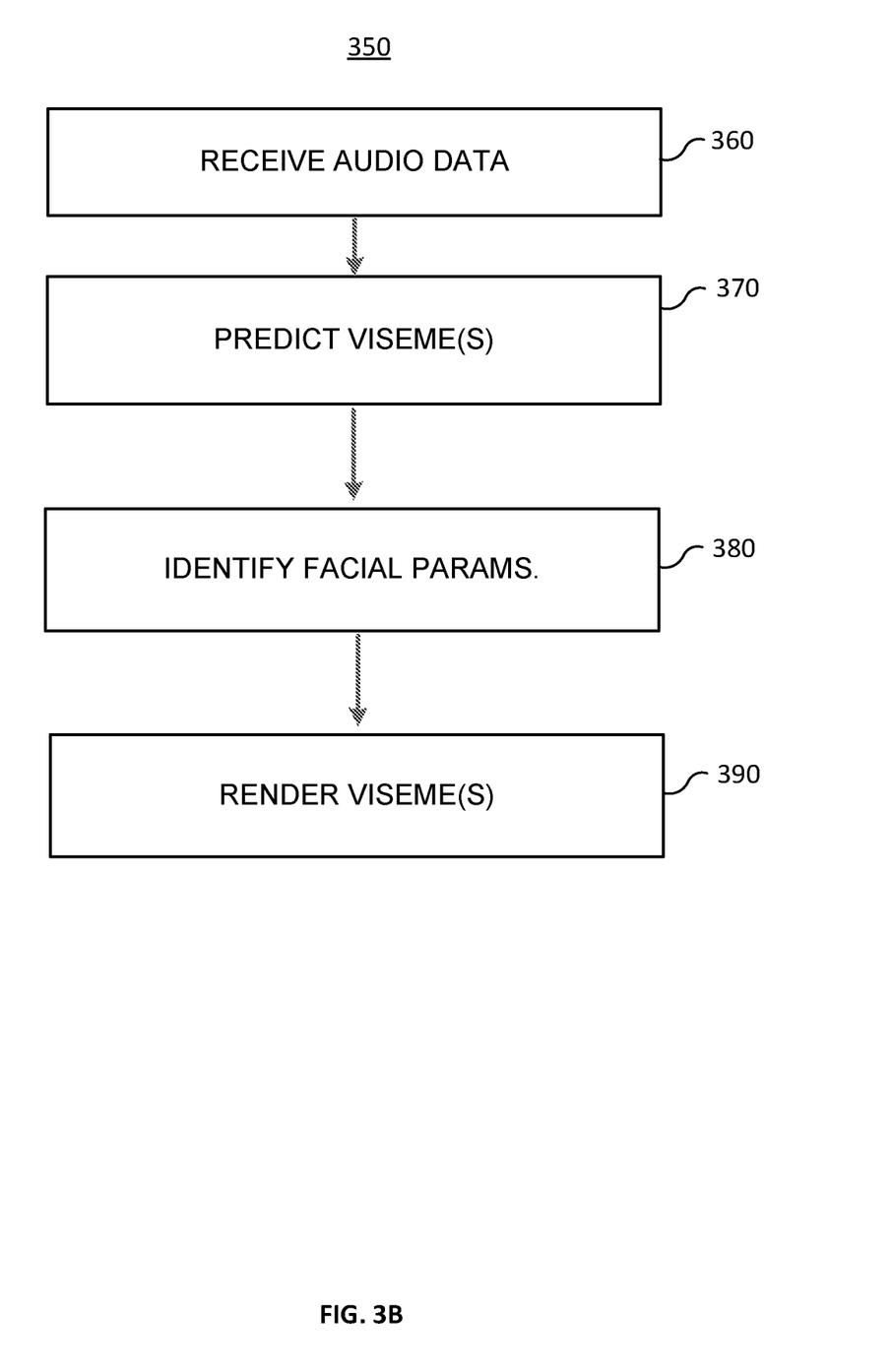
FIG. 3B is a diagram illustrating an exemplary flowchart according to some embodiments.

As shown in flowchart diagram 350 of the example of FIG. 3B, the Viseme Engine receives audio data associated with a user account. (Step 360) The Viseme Engine predicts at least one viseme that corresponds with a portion of phoneme audio data. (Step 370) The Viseme Engine identifies one or more facial expression parameters associated with the predicted viseme. (Step 380) The facial expression parameters are applicable to a face model. The Viseme Engine renders the predicted viseme according to the one or more facial expression parameters. (Step 390)

According to one or more embodiments, multiple participant user accounts accessing a current virtual online conference may be presented a data feed associated with a speaker user account whereby the data feed includes video feed of a rendering of a digital embodiment and live, real-time audio data from the speaker user account. As various spoken sounds in the audio data speaker user account are broadcast, the Viseme Engine renders, in real-time, lip, mouth and/or facial movements of the digital embodiment that portray physical pronunciation of the concurrently broadcast sounds.

The Viseme Engine continually generates a sequence of identified visemes and further generates corresponding facial expression parameters based on the identified visemes. The Viseme Engine utilizes the facial expression parameters to render a face mesh for a digital embodiment that performs the appropriate visemes that represent the current audio data of the audio data from, for example, a speaker user account. In some embodiments, the sequence of visemes may be a sequence of predicted viseme identifiers. Each viseme identifier represents a unique viseme that has been predefined as being matched to one or more different phonemes.

Various embodiments of the Viseme Engine renders a viseme(s) via a digital embodiment without requiring introduction of a delay in the audio data, whereby such a delay could be leverage to allow for enough time to capture the entirety of a phoneme's corresponding audio data. The Viseme Engine thereby predicts an appropriate viseme that should be rendered via the digital embodiment, in conjunction with audio data, based on incomplete phoneme audio data. For example, the Viseme Engine determines a predicted viseme that corresponds with a current audio frame transmitted in a virtual online conference. The predicted viseme is based on features of one or more audio frames before the current audio frame. In some embodiments, each audio frame may be 200 milliseconds, for example, and the predicted viseme corresponds to IO milliseconds of current audio frame data.

Figure 4:
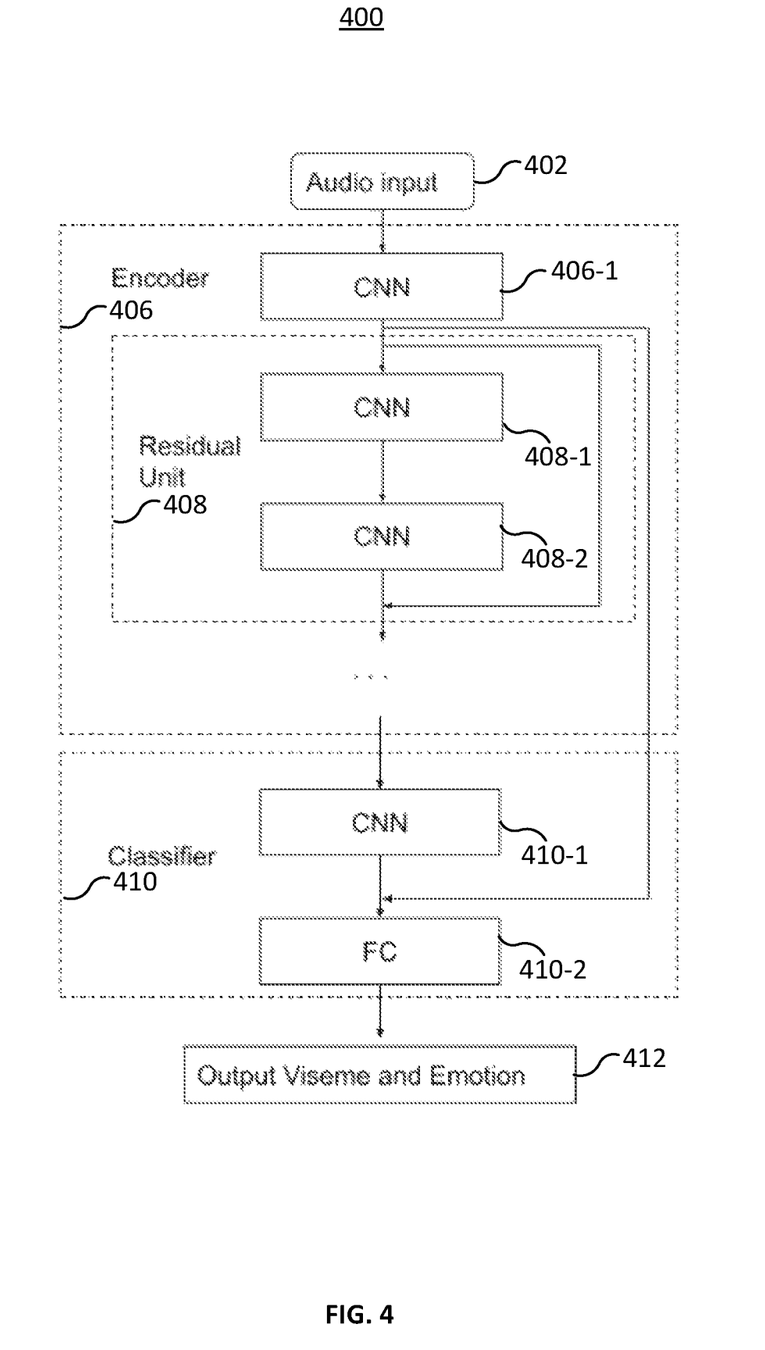
FIG. 4 is a diagram illustrating an exemplary environment in which some embodiments may operate.

As shown in diagram 400 of the example of FIG. 4, the viseme and emotion detection module 310 of the Viseme Engine receives input audio data 402. The audio data 402 is fed into an encoder module 406. The encoder 406 includes one or more convolutional neural networks (CNN) 406-1, 408-1, 408-2 . . . . In some embodiments, layers of the CNN's 406-1, 408-1, 408-2 implement batch normalization and non-linear activation ReLU (Rectified Linear Unit) algorithms on various portions of the fed audio data. In various embodiments, the activation function used may also be based on Exponential Linear Unit (ELU), Parametric Rectified Linear Unit (PReLU), and/or other activation functions In some embodiments, the audio data 406-1 is fed into a first CNN 406-1 and output from the first CNN 406-1 is fed into a residual unit(s) 408. The output from the CNN 406-1 is further fed through additional CNN's 408-1, 408-2. Output from the encoder 406 connects with output from a residual unit(s) 408 and the connected output flows to a classifier module 410.

The classifier module 410 includes a CNN 410-1. For example, the CNN 410-1 in the classifier module 410 may be a single layer CNN (for example, with a kernel size of 1) that flows to another fully-connected layer 410-2 that output from the CNN 410-1 is connected with output from the encoder 406.

The classifier module 410 outputs a sequence of predicted visemes. The viseme and emotion detection module 310 predicts respective visemes based on features of the input audio data 402. In some embodiments, the features may be raw wave features, spectral features (MFCC or Mel-frequency cepstrum) (Log-Mel) or spectrogram features of audio frames in the input audio data 402. For example, an audio frame may be defined as a portion of the input audio data with a specific duration between 100-500 milliseconds. For example, an audio frame may be defined as 200 millisecond portions in the input audio data 402 or may be defined as 300 millisecond portions in the input audio data 402.

Figure 5:
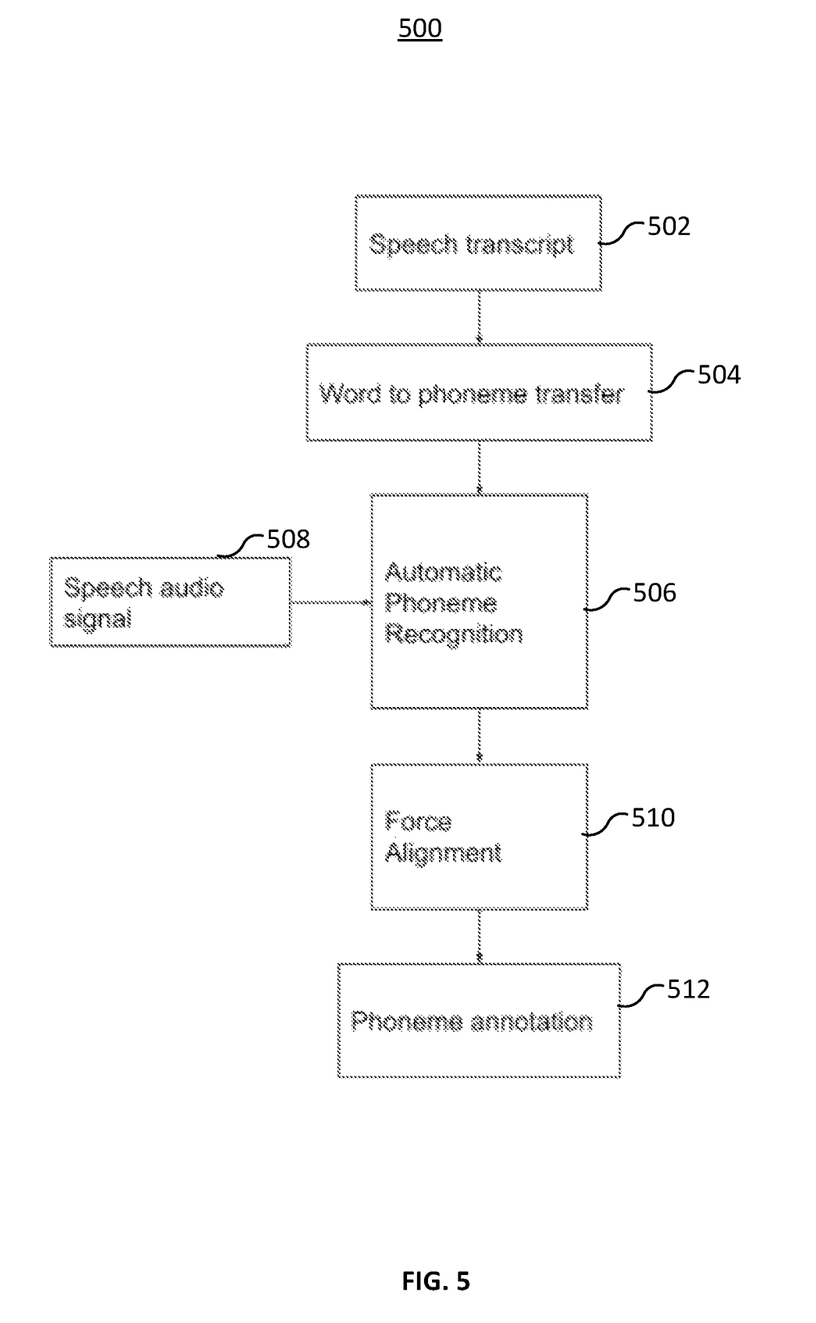
FIG. 5 is a diagram illustrating an exemplary environment in which some embodiments may operate.

As shown in diagram 500 of the example of FIG. 5, implementation of various embodiments of the Viseme Engine include generation of a training dataset for the viseme and emotion detection module 320. One or more automatic speech recognition (ASR) datasets include translations from various types of audio signals to respective text and/or labels. Various transcripts 502 from the one or more ASR datasets are obtained.

A word to phoneme transfer model 504 maps the audio signals from the ASR dataset transcripts 502 to various phonemes. A predefined mapping further separates respective phonemes across a set of visemes. In various embodiments, the mapping establishes a relationship between each phoneme with a particular viseme from a set of visemes. The set of visemes may include 5-30 visemes and each phoneme may be mapped to a viseme defined in the set of visemes. It is understood that multiple phonemes may be mapped to the same viseme.

For example, a first portion of an audio signal 508 may include a sound of a pronunciation of the letter "s" and a second portion of the audio signal 508 may include a sound of a pronunciation of the letter "z." Both the first and second portions of the audio signal 508 thereby correspond to similar spectral features due to a similarity of the pronunciation sounds. An automatic phoneme recognition module 506 utilizes the word to phoneme transfer model 504 to map the first and second portions of audio 508 to the appropriate phonemes for both the letter "s" and the letter "z" individually.

A phoneme annotation module 512 may append a label (or metadata) to the first and second portions of the audio signal 508 that identifies the appropriate phonemes. The phonemes are mapped by module 512 to the same viseme because the visual appearance of an individual's mouth physically pronouncing the "s" sound and the "z" sound is similar.

As such, the labeled first and second portions of the audio signal 508 are part of a training data set for the viseme and emotion detection module 320 that can be implemented to train the module 320 to identify features (e.g. Log-Mel or MFCC spectral features) of input audio signals that represent instances of various different types of phonemes. For output phoneme sequences from the automatic phoneme recognition module 506 without utilization of any time information, a force alignment module 510 aligns phonemes in the output phoneme sequence to audio frames. The force alignment module 510 thereby outputs an updated sequence of phonemes for each audio frame within the given time information.

In some embodiments, the Viseme Engine applies smoothing processing to one or more detected visemes via viseme detection output 412. The Viseme Engine detects that one or more portions of the audio signal 402 corresponds to a first phoneme prior to completion of the first phoneme's entire audio signal. However, the Viseme Engine further detects a difference (or a change) in one or more portions of the audio signal 402 that immediately follow those audio signal portions for the detected first phoneme. That is, the Viseme Engine detects the immediately subsequent audio signal portions correspond instead to a different second phoneme. In some embodiments, the detected phoneme difference (or change) may be based on features in the audio signal related to the signal energy envelope.

Based on detection of the difference, the smoothing processing of the Viseme Engine inserts a viseme for the first phoneme in the output sequence of predicted visemes. The Viseme Engine may further insert another viseme for the different second phoneme into the output sequence of predicted visemes as well.

Figure 6:
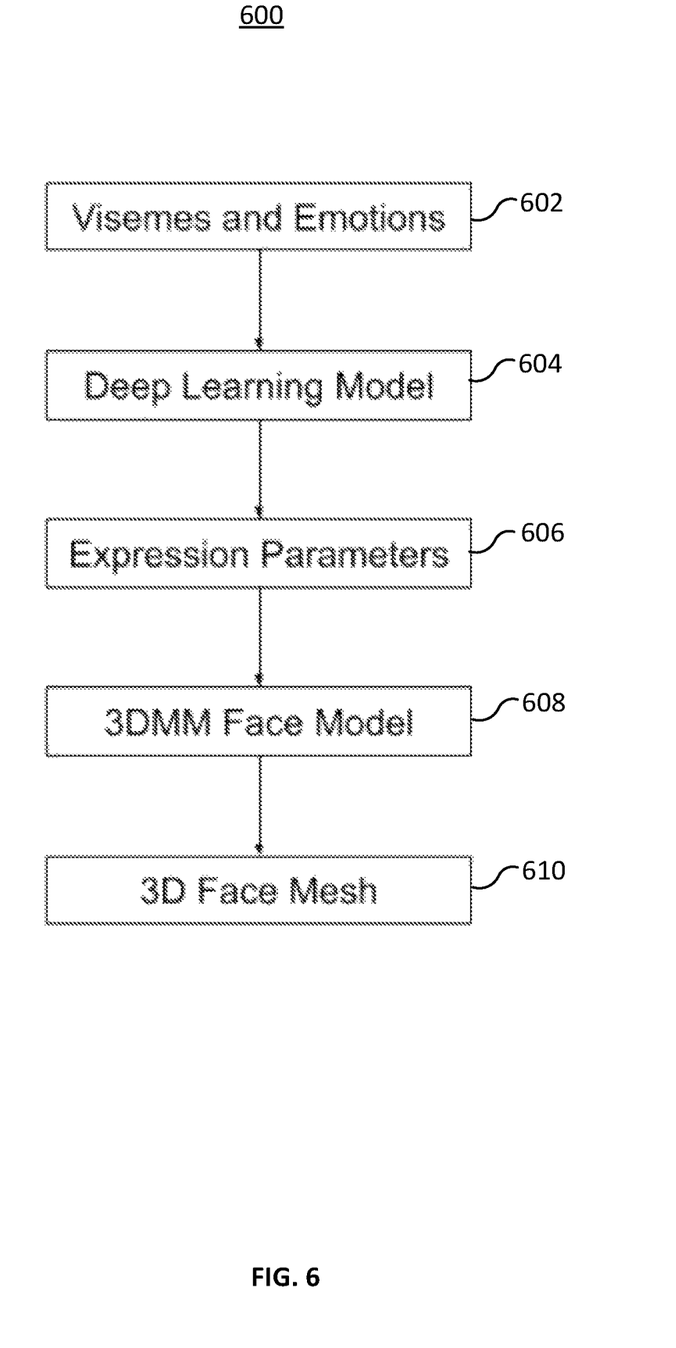
FIG. 6 is a diagram illustrating an exemplary flowchart according to some embodiments.

As shown in flowchart 600 of the example of FIG. 6, the talking face generation module 330 receives one or more predicted visemes 602 from the viseme and emotion detection module 310. For example, the module 330 receives a sequence of predicted visemes whereby each viseme corresponds with 10 millisecond audio frames in the audio data 402. It is understood that various embodiments are not limited to audio frames to IO milliseconds and that audio frames can be set to any duration of time.

The predicted visemes are fed into a deep learning model 604 which outputs one or more facial expressions parameters for each predicted viseme. The facial expression parameters correspond to a predefined 3D morphable face model 608 ("3DMM face model"). The Viseme Engine applies facial expression parameters to the 3DMM face model 608 to generate output of a 3D face mesh 610 for rendering of graphic lip movements of a digital embodiment. The rendered graphic lip movements portray mouth shapes that are performed when an individual physically pronounces a phoneme sound that is mapped to a predicted viseme that corresponds with the applied facial expression parameters. In some embodiments, the deep learning model 604 learns and further outputs facial parameters for the generation and rendering of transitionary facial expressions to occur between renderings of predicted visemes.

In some embodiments, video input may be received by the Viseme Engine to be processed in combination with the sequence of predicted visemes. For example, the Viseme Engine blends the video data from camera tracking associated with a speaker user account. Video data from the speaker user account may be received by the Viseme Engine and the Viseme Engine concurrently receives audio data from the speaker user account and generates a sequence of predicted visemes based on the speaker user account's audio data.

The Viseme Engine adaptively blends video data and audio data from the speaker user account based on real-time video and audio conditions (or events). As the effects of certain audio events potentially impact of the quality of rendered facial expressions for a digital embodiment, the Viseme Engine increases the importance of various features in the video data in determining predicted visemes. Likewise, as the effects of certain video events potentially impact of the quality of rendered facial expressions for the digital embodiment, the Viseme Engine increases the importance of various features in the audio data in determining predicted visemes. An audio event may be, for example, an increase in ambient noise and/or microphone failure for a particular amount of time. A video event may be, for example, a period of time during which there is a low-quality of camera focus and/or the presence of poor lighting conditions.

Another type of video event may also be an occlusion. For example, the video data may include a time range of one or more video frames in which a portrayal of a face associated with the speaker user account becomes occluded. The Viseme Engine detects the instance of the occlusion. Occlusion detection triggers application of a portion of the predicted visemes that correspond with the range of video frames at which the detected instance of occlusion occurs.

Figure 7:
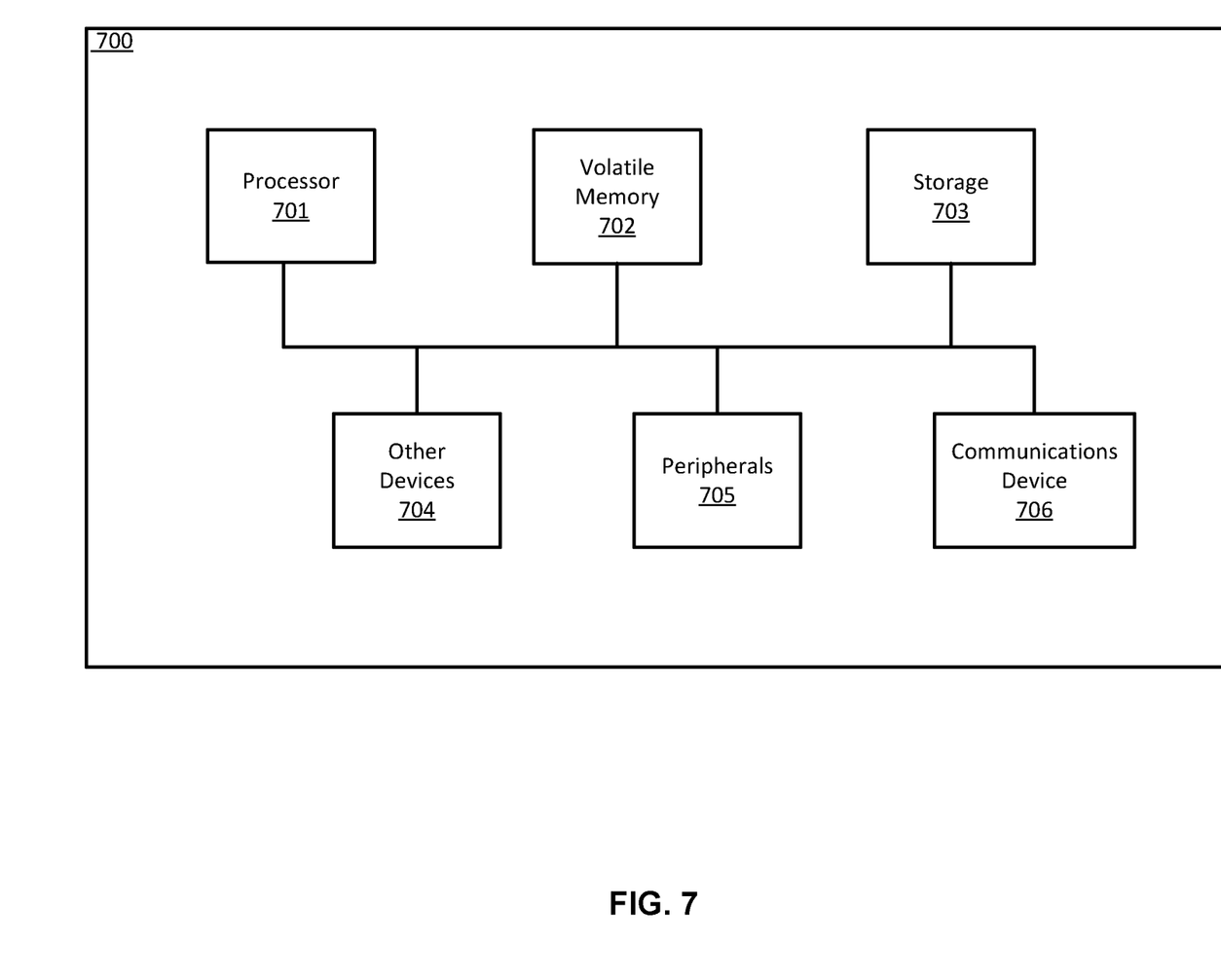
FIG. 7 is a diagram illustrating an exemplary environment in which some embodiments may operate.

FIG. 7 is a diagram illustrating an exemplary computer that may perform processing in some embodiments. As shown in the example of FIG. 7, an exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701.

RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-Rand DVD-R recorders/players. Communications device 706 may connect the computer 700 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computer device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

It will be appreciated that the present disclosure may include any one and up to all of the following examples.

Example 1: A computer-implemented method comprising: receiving audio data associated with a user account; predicting at least one viseme that corresponds with a portion of phoneme audio data; identifying one or more facial expression parameters associated with the predicted viseme, the one or more facial expression parameters applicable to a face model; and rendering the predicted viseme according to the one or more facial expression parameters.

Example 2: The method of Example 1, wherein predicting at least one viseme comprises: predicting a first viseme that corresponds to a current time range of audio data based on audio data that precedes the current time range of audio data.

Example 3: The method of any Examples 1-2, wherein receiving audio data comprises: receiving respective phoneme portions of audio data that correspond to an instance of a phoneme sound; and wherein predicting at least one viseme comprises: predicting a viseme for a current phoneme portion based on one or more of the phoneme portions of audio data that precede the current phoneme portion.

Example 4: The method of any Examples 1-3, further comprising: predicting the viseme for the current phoneme portion in the audio data prior to completion of an entirety of the instance of the phoneme sound.

Example 5: The method of any Examples 1-4, further comprising: predicting the viseme based on one or more spectral features of the one or more of the phoneme portions of audio data that precede the current phoneme portion.

Example 6: The method of any Examples 1-5, wherein rendering the predicted viseme comprises: rendering the predicted viseme via a digital embodiment defined according to the face model.

Example 7: The method of any Examples 1-6, wherein the digital embodiment represents the user account in video data associated with a virtual online conference.

Example 8: The method of any Examples 1-7, wherein the audio data comprises audio data from the user account represented by the digital embodiment.

Example 9: The method of any Examples 1-8, wherein identifying one or more facial expression parameters comprises: identifying one or more sets of facial parameters for transitionary facial expressions between a first predicted viseme and a second predicted viseme.

Example 10: A non-transitory computer-readable medium having a computer-readable program code embodied therein to be executed by one or more processors, the program code including instructions for: receiving audio data associated with a user account; predicting at least one viseme that corresponds with a portion of phoneme audio data; identifying one or more facial expression parameters associated with the predicted viseme, the one or more facial expression parameters applicable to a face model; and rendering the predicted viseme according to the one or more facial expression parameters.

Example 11: The non-transitory computer-readable medium of Example 10, wherein predicting at least one viseme comprises: detecting a change from an instance of a first phoneme sound to an instance of a second phoneme sound in the audio signal; and generating a smoothed output sequence of predicted visemes that includes a first viseme that corresponds to the first phoneme and a second viseme that corresponds to the second phoneme.

Example 12: The non-transitory computer-readable medium of any Examples 10-11, wherein detecting a change comprises: predicting a current audio frame in the audio signal corresponds to the instance of the first phoneme sound based on respective features of one or more audio frames prior to the current audio frame; and detecting the change in subsequent audio frames.

Example 13: The non-transitory computer-readable medium of any Examples 10-12, wherein generating a smoothed output sequence of predicted visemes comprises: inserting a first viseme identifier predefined as related to the first phoneme sound in the output sequence of predicted visemes; and inserting a second viseme identifier, subsequent to the first viseme identifier, predefined as related to the second phoneme sound in the output sequence of predicted visemes.

Example 14: The non-transitory computer-readable medium of any Examples 10-13, wherein detecting the change comprises: detecting the change after the current audio frame and occurring prior to any audio frames representative of a terminal portion of the instance of the first phoneme sound.

Example 15: The non-transitory computer-readable medium of any Examples 10-14, wherein receiving audio data associated with a user account comprises: receiving audio data associated with a speaker user account in a virtual online conference accessed by a plurality of different user accounts; and receiving video data concurrently with receipt of the audio data, the video data associated with the speaker user account and further comprising one or more video frames for live portrayal of a face of an individual associated with the speaker user account.

Example 16: The non-transitory computer-readable medium of any Examples 10-15, wherein predicting at least one viseme that corresponds with a portion of phoneme audio data comprises: generating a sequence of predicted viseme identifiers that corresponds to respective detected different instances of phoneme audio frames as the video data of the speaker user account is presented in the virtual online conference.

Example 17: The non-transitory computer-readable medium of any Examples 10-16, further comprising: detecting one or more video frames of the video data, the detected video frames representing an occlusion of at least a portion of the live portrayal of a face of an individual associated with the speaker user account.

Example 18: The non-transitory computer-readable medium of any Examples 10-17, further comprising: identifying a current audio frame that corresponds with the one or more of the detected video frames representing the occlusion; and accessing a particular predicted viseme for the current audio frame.

Example 19: The non-transitory computer-readable medium of any Examples 10-18, wherein rendering the predicted viseme according to the one or more facial expression parameters comprises: blending at least a portion of a rendered particular predicted viseme with at least a portion of the detected video frames representing the occlusion.

Example 20: A communication system comprising one or more processors configured to perform the operations of: receiving audio data associated with a speaker user account in a virtual online conference accessed by a plurality of additional user accounts; predicting an output sequence of predicted visemes, each respective predicted viseme corresponding with one or more portions of phoneme audio data of the speaker user account, the predicting including: (i) predicting a first viseme for a current audio frame prior to completion of an entirety of an instance of a first phoneme sound in the audio data; (ii) detecting a change from the instance of a first phoneme sound to an instance of a second phoneme sound in the audio data, the change occurring after the current audio frame and prior to receipt of any audio frames representative of a terminal portion of the instance of the first phoneme sound; (iii) after prediction of the first viseme, predicting a second viseme for instance of the second phoneme sound prior to completion of an entirety of the instance of the second phoneme sound; and (iv) generating a smoothed output sequence of predicted visemes that includes at least the first viseme and the second viseme; identifying one or more facial expression parameters associated with at least one of the predicted visemes in the output sequence of predicted visemes, the one or more facial expression parameters applicable to a face model utilized for rendering of a digital embodiment for the speaker user account; and rendering the at least one predicted viseme at the digital embodiment according to the one or more facial expression parameters.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising:
receiving audio data and video data associated with a user account, wherein the video data includes one or more frames that include an occluded portion, wherein receiving audio data associated with the user account comprises receiving audio data associated with a speaker account in a virtual online conference accessed by different user accounts;

identifying a portion of the audio data that corresponds to the one or more frames that include the occluded portion;

predicting, based on the audio data and the video data, at least one viseme that corresponds with a portion of phoneme audio data, wherein predicting at least one viseme that corresponds with a portion of phenome audio data comprises generating a sequence of predicted viseme identifiers that corresponds to respective detected different instances of phenome audio frames as video data of the speaker user account is presented in the virtual online conference;

identifying one or more facial expression parameters associated with the at least one predicted viseme, the one or more facial expression parameters applicable to a face model; and rendering the at least one predicted viseme according to the one or more facial expression parameters.

2. The computer-implemented method of claim 1, wherein predicting at least one viseme comprises:
predicting a first viseme that corresponds to a current time range of audio data based on audio data that precedes the current time range of audio data.

3. The computer-implemented method of claim 1, wherein receiving audio data comprises:
receiving respective phoneme portions of audio data that correspond to an instance of a phoneme sound; and
wherein predicting at least one viseme comprises:
predicting a viseme for a current phoneme portion based on one or more of the phoneme portions of audio data that precede the current phoneme portion.

4. The computer-implemented method of claim 1, further comprises:
receiving respective phoneme portions of audio data that correspond to an instance of a phoneme sound; and
wherein predicting at least one viseme comprises:
predicting a viseme for a current phoneme portion based on one or more of the phoneme portions of audio data that precede the current phoneme portion; and
predicting the viseme for the current phoneme portion in the audio data prior to completion of an entirety of the instance of the phoneme sound.

5. The computer-implemented method of claim 1, further comprises:
receiving respective phoneme portions of audio data that correspond to an instance of a phoneme sound; and
wherein predicting at least one viseme comprises:
predicting a viseme for a current phoneme portion based on one or more of the phoneme portions of audio data that precede the current phoneme portion;
predicting the viseme for the current phoneme portion in the audio data prior to completion of an entirety of the instance of the phoneme sound; and
predicting the viseme based on one or more spectral features of the one or more of the phoneme portions of audio data that precede the current phoneme portion.

6. The computer-implemented method of claim 1, wherein rendering the predicted viseme comprises:
rendering the predicted viseme via an animated facial movement defined according to the face model.

7. The computer-implemented method of claim 1, wherein rendering the predicted viseme comprises:
rendering the predicted viseme via an animated facial movement defined according to the face model, and wherein the animated facial movement represents the user account in video data associated with a virtual online conference.

8. The computer-implemented method of claim 1, wherein rendering the predicted viseme comprises:
rendering the predicted viseme via an animated facial movement defined according to the face model, wherein the animated facial movement represents the user account in video data associated with a virtual online conference, and wherein the audio data comprises audio data from the user account represented by the animated facial movement.

9. The computer-implemented method of claim 1, wherein identifying one or more facial expression parameters comprises:
identifying one or more sets of facial parameters for transitionary facial expressions between a first predicted viseme and a second predicted viseme.

10. A non-transitory computer-readable medium having a computer-readable program code embodied therein to be executed by one or more processors, the program code including instructions for:
receiving audio data and video data associated with a user account, wherein the video data includes one or more frames that include an occluded portion, wherein receiving audio data associated with the user account comprises receiving audio data associated with a speaker account in a virtual online conference accessed by different user accounts;
predicting, based on the audio data and the video data, at least one viseme that corresponds with a portion of phoneme audio data, wherein predicting at least one viseme that corresponds with a portion of phenome audio data comprises generating a sequence of predicted viseme identifiers that corresponds to respective detected different instances of phenome audio frames as video data of the speaker user account is presented in the virtual online conference;
identifying one or more facial expression parameters associated with the at least one predicted viseme, the one or more facial expression parameters applicable to a face model; and
rendering the at least one predicted viseme according to the one or more facial expression parameters.

11. The non-transitory computer-readable medium of claim 10, wherein predicting at least one viseme comprises:
detecting a change from an instance of a first phoneme sound to an instance of a second phoneme sound in the audio signal; and
generating a smoothed output sequence of predicted visemes that includes a first viseme that corresponds to the first phoneme and a second viseme that corresponds to the second phoneme.

12. The non-transitory computer-readable medium of claim 10, wherein predicting at least one viseme comprises:
detecting a change from an instance of a first phoneme sound to an instance of a second phoneme sound in the audio signal; and
generating a smoothed output sequence of predicted visemes that includes a first viseme that corresponds to the first phoneme and a second viseme that corresponds to the second phoneme,
wherein detecting a change comprises:
predicting a current audio frame in the audio signal corresponds to the instance of the first phoneme sound based on respective features of one or more audio frames prior to the current audio frame; and
detecting the change in subsequent audio frames.

13. The non-transitory computer-readable medium of claim 10, wherein predicting at least one viseme comprises:

detecting a change from an instance of a first phoneme sound to an instance of a second phoneme sound in the audio signal; and generating a smoothed output sequence of predicted visemes that includes a first viseme that corresponds to the first phoneme and a second viseme that corresponds to the second phoneme, wherein detecting a change comprises:

predicting a current audio frame in the audio signal corresponds to the instance of the first phoneme sound based on respective features of one or more audio frames prior to the current audio frame; and detecting the change in subsequent audio frames, and wherein generating a smoothed output sequence of predicted visemes comprises:

inserting a first viseme identifier predefined as related to the first phoneme sound in the output sequence of predicted visemes; and inserting a second viseme identifier, subsequent to the first viseme identifier, predefined as related to the second phoneme sound in the output sequence of predicted visemes.

14. The non-transitory computer-readable medium of claim 10, wherein predicting at least one viseme comprises:

detecting a change from an instance of a first phoneme sound to an instance of a second phoneme sound in the audio signal; and generating a smoothed output sequence of predicted visemes that includes a first viseme that corresponds to the first phoneme and a second viseme that corresponds to the second phoneme, wherein detecting a change comprises:

predicting a current audio frame in the audio signal corresponds to the instance of the first phoneme sound based on respective features of one or more audio frames prior to the current audio frame;

detecting the change in subsequent audio frames; and detecting the change after the current audio frame and occurring prior to any audio frames representative of a terminal portion of the instance of the first phoneme sound, and wherein generating a smoothed output sequence of predicted visemes comprises:

inserting a first viseme identifier predefined as related to the first phoneme sound in the output sequence of predicted visemes; and inserting a second viseme identifier, subsequent to the first viseme identifier, predefined as related to the second phoneme sound in the output sequence of predicted visemes.

15. The non-transitory computer-readable medium of claim 10, wherein receiving audio data associated with a user account comprises:

receiving audio data associated with a speaker user account in a virtual online conference accessed by a plurality of different user accounts; and receiving video data concurrently with receipt of the audio data, the video data associated with the speaker user account and further comprising one or more video frames for live portrayal of a face of an individual associated with the speaker user account.

16. The non-transitory computer-readable medium of claim 10, wherein receiving audio data associated with a user account comprises:

receiving audio data associated with a speaker user account in a virtual online conference accessed by a plurality of different user accounts; and receiving video data concurrently with receipt of the audio data, the video data associated with the speaker user account and further comprising one or more video frames for live portrayal of a face of an individual associated with the speaker user account, wherein predicting at least one viseme that corresponds with a portion of phoneme audio data comprises:

generating a sequence of predicted viseme identifiers that corresponds to respective detected different instances of phoneme audio frames as the video data of the speaker user account is presented in the virtual online conference.

17. The non-transitory computer-readable medium of claim 10, wherein receiving audio data associated with a user account comprises:

receiving audio data associated with a speaker user account in a virtual online conference accessed by a plurality of different user accounts; and receiving video data concurrently with receipt of the audio data, the video data associated with the speaker user account and further comprising one or more video frames for live portrayal of a face of an individual associated with the speaker user account, wherein predicting at least one viseme that corresponds with a portion of phoneme audio data comprises:

generating a sequence of predicted viseme identifiers that corresponds to respective detected different instances of phoneme audio frames as the video data of the speaker user account is presented in the virtual online conference, the non-transitory computer-readable medium further comprising:

detecting one or more video frames of the video data, the detected video frames representing an occlusion of at least a portion of the live portrayal of a face of an individual associated with the speaker user account.

18. The non-transitory computer-readable medium of claim 10, wherein receiving audio data associated with a user account comprises:

receiving video data concurrently with receipt of the audio data, the video data associated with the speaker user account and further comprising one or more video frames for live portrayal of a face of an individual associated with the speaker user account; and accessing a particular predicted viseme for the identified portion of the audio data.

19. The non-transitory computer-readable medium of claim 10, wherein receiving audio data associated with a user account comprises:

receiving audio data associated with a speaker user account in a virtual online conference accessed by a plurality of different user accounts; and receiving video data concurrently with receipt of the audio data, the video data associated with the speaker user account and further comprising one or more video frames for live portrayal of a face of an individual associated with the speaker user account, wherein predicting at least one viseme that corresponds with a portion of phoneme audio data comprises:

generating a sequence of predicted viseme identifiers that corresponds to respective detected different instances of phoneme audio frames as the video data of the speaker user account is presented in the virtual online conference; and accessing a particular predicted viseme for the identified portion of the audio data, wherein rendering the predicted viseme according to the one or more facial expression parameters comprises:

blending at least a portion of a rendered particular predicted viseme with at least a portion of the detected video frames representing the occlusion.

20. A communication system comprising:

a processor configured to:
- receive audio data and video data associated with a user account, wherein the video data includes one or more frames that include an occluded portion, wherein the audio data associated with the user account is associated with a speaker account in a virtual online conference accessed by different user accounts;
- predict, based on the audio data and the video data, at least one viseme that corresponds with a portion of phoneme audio data, wherein the prediction of the at least one viseme that corresponds with a portion of phenome audio data comprises a generation of a sequence of predicted viseme identifiers that correspond to respective detected different instances of phenome audio frames as video data of the speaker user account that are presented in the virtual online conference;

identify one or more facial expression parameters associated with the at least one predicted viseme, the one or more facial expression parameters applicable to a face model; and render the at least one predicted viseme according to the one or more facial expression parameters.

* * * * *